US012784713B1

(12) United States Patent
Spangler et al.

(10) Patent No.: US 12,784,713 B1
(45) Date of Patent: Nov. 3, 2026

(54) ACOUSTIC GUITAR WITH ADJUSTABLE SOUNDBOARD AND RELATED METHODS

(71) Applicant: Ciari Guitars, Inc., San Diego, CA (US)

(72) Inventors: Jonathan Spangler, San Diego, CA (US); Joseph Glaser, II, Nashville, TN (US)

( * ) Notice: Subject to any disclaimer, the term of this patent is extended or adjusted under 35 U.S.C. 154(b) by 597 days.

(21) Appl. No.: 18/079,520

(22) Filed: Dec. 12, 2022

Related U.S. Application Data

(60) Provisional application No. 63/288,646, filed on Dec. 12, 2021.

(51) Int. Cl.
*G10D 3/02* (2006.01)
*G10D 1/08* (2006.01)

(52) U.S. Cl.
CPC ................ *G10D 3/02* (2013.01); *G10D 1/08* (2013.01)

(58) Field of Classification Search
CPC .. G10D 3/02; G10D 1/08; G10D 3/00; G10D 1/00
See application file for complete search history.

(56) References Cited

U.S. PATENT DOCUMENTS 5,895,872 A * 4/1999 Chase ...................... G10D 3/22 84/452 P
7,687,696 B2 * 3/2010 Fox .......................... G10D 3/06 84/290

* cited by examiner

*Primary Examiner* — Kimberly R Lockett
(74) *Attorney, Agent, or Firm* — Jonathan D. Spangler; Jay B. Bell

(57) ABSTRACT

An adjustable soundboard for an acoustic stringed instrument, such as an acoustic guitar, which allows tension to be selectively applied areas of the soundboard to achieve desired acoustic properties and/or voicing of the soundboard.

19 Claims, 12 Drawing Sheets

ACOUSTIC GUITAR WITH ADJUSTABLE SOUNDBOARD AND RELATED METHODS

CROSS REFERENCES TO RELATED APPLICATIONS

The present application is non-provisional patent application claiming benefit under 35 USC Section 119(e) from U.S. Provisional Patent Application Ser. No. 63/288,646 filed Dec. 12, 2021, entitled "Acoustic Guitar with Adjustable Soundboard and Related Methods," the entire content of which is hereby expressly incorporated by reference into this disclosure as if set forth fully herein.

BACKGROUND OF THE INVENTION

I. Field of the Invention

The present invention relates generally to musical instruments and, more particularly, to an acoustic guitar having an adjustable soundboard for selectively modifying and/or optimizing the tension imparted upon the soundboard to achieve a desired voicing of the acoustic guitar.

II. Discussion of the Prior Art

Stringed instruments, such as acoustic guitars, have enjoyed among the highest popularity among musical instruments. Acoustic guitars include a body, a neck and multiple strings that span from tuners on the headstock to a bridge located on the upper surface of the body. The body includes a bottom, sides, and a top otherwise known as the "soundboard." The body and neck may be made from any number of suitable materials, including most commonly wood. As the name suggests, the soundboard of the body is the primary contributor to the sound or voicing of an acoustic guitar. During the manufacture of traditional acoustic guitars, a series of braces are typically mounted to the lower surface of the soundboard, which provide a desired amount of stiffness and shape of the soundboard to achieve a desired voicing of the acoustic guitar. While generally effective, the traditional braces are static in their ability to impact the voicing of the acoustic guitar, meaning the voicing of the soundboard is set otherwise fixed during manufacture and, without significant modifications to the soundboard post-manufacture, cannot be altered over time. The present invention is addressing this limitation in traditional soundboard bracing.

SUMMARY OF THE INVENTION

The present invention accomplishes this goal by providing adjustable soundboard bracing to enable customization of the forces being subjected to the soundboard, which enables tailoring the voicing and acoustic properties of the soundboard. The adjustable soundboard bracing of the present invention may be applied to any of a variety of acoustic guitars, including those manufactured from carbon fiber, wood, and/or alternate materials such as aluminum. While referred to hereinafter within the context of an acoustic guitar, it will be appreciated that the scope of the invention extends beyond acoustic guitars and may include, by way of example only, any of a variety of acoustic instruments beyond guitars, such as (by way of example only) ukulele. Also, while shown and described herein within the context of a foldable acoustic guitar, it will be appreciated that the adjustable soundboard may be used with non-foldable acoustic instruments without departing from the scope of the present invention.

According to one aspect, an adjustable soundboard assembly for an acoustic stringed instrument is disclosed, comprising a soundboard and at least one adjustable brace on a lower surface of the soundboard, wherein said at least one adjustable brace is configured to be adjusted to impart at least one of a convexity and a concavity to said adjustable brace to thereby alter at least one voicing characteristic of said soundboard.

In another embodiment, the adjustable brace of the soundboard assembly is formed as an integral part of said soundboard. In another embodiment, the adjustable brace of the adjustable soundboard assembly is mounted to said lower surface of said soundboard. In one embodiment, the at least one voicing characteristic of said soundboard includes at least one of a resonant frequency and a location of a resonant frequency. In another embodiment, said at least one adjustable brace is adjustable via at least one adjustment nut coupled to at least one cable extending between a first end and a second end of said adjustable brace. In yet another embodiment, said at least one adjustable brace includes a cable extending between a first position and a second position that is configured to be at least one of selectively tightened and loosened to alter said at least one voicing characteristic of said soundboard. In a still further embodiment, the at least one adjustable brace includes a cable extending between a distal post, a proximal adjustment nut, and a middle post, wherein said distal post and said proximal adjustment nut are at a first vertical height and said middle post is at a second vertical height that is higher than said first vertical height. In another embodiment, the at least one adjustable brace includes a proximal adjustment nut that is rotatable to selectively tighten and loosen a cable to alter said at least one voicing characteristic of said soundboard. In yet another embodiment, the at least one adjustable brace includes an upper surface, a lower surface adjacent to said soundboard, and plurality of notches formed along at least one of said upper and lower surfaces to facilitate bending said adjustable brace to selectively alter said at least one voicing characteristic of said soundboard.

In another aspect, an adjustable soundboard assembly for an acoustic stringed instrument is provided, comprising a soundboard and at least one adjustable nut mounted along a perimeter of the soundboard, and at least one cable coupled to said at least one adjustment nut, wherein said at least one adjustment nut is configured to be selectively tightened and loosened to impart at least one of a convexity and a concavity to said soundboard to thereby alter at least one voicing characteristic of said soundboard.

In one embodiment, the at least one adjustment nut is rotatable within a nut housing formed as an integral part of said soundboard extending from said lower surface of said soundboard. In yet another embodiment, the at least one adjustment nut is rotatable within a nut housing mounted to said lower surface of said soundboard. In a still further embodiment, the at least one voicing characteristic of said soundboard includes at least one of a resonant frequency and a location of a resonant frequency. In another embodiment, the at least one adjustment nut is accessible from a side aperture formed along said perimeter of said soundboard. In a still further embodiment, the at least one cable and said at least one adjustment nut are housed within a brace mounted to said lower surface of said soundboard. In yet another embodiment, the at least one cable and said at least one adjustment nut are housed within a brace integrally formed with said soundboard. In another embodiment, the at least one cable extends between said adjustment nut and a fulcrum located a distance away from said adjustment nut. In a still further embodiment, the fulcrum has at least one of a fixed location and an adjustable location on said soundboard. In yet another embodiment, the fulcrum has a plurality of prongs configured to engage and maintain said at least one cable at a given vertical height relative to said lower surface of said soundboard. In another embodiment, the fulcrum has at least one aperture dimensioned to receive said at least one cable, wherein said fulcrum is at least one of height-adjustable and fixed-height.

As used herein, the term "convexity" is defined to mean any amount of bending or deformation, whether perceptible to the naked eyes or not, of the brace in a downward direction such that one or both of the ends of the brace move downward relative to the middle section of the brace. Conversely, as used herein the term "concavity" is defined to mean any amount of bending or deformation, whether perceptible to the naked eyes or not, of the brace in an upward direction such that one or both of the ends of the brace move upward relative to the middle section of the brace. Whether mounted to or forming part of the soundboard, the adjustable brace—when adjusted according to the present disclosure—modifies the shape of the adjustable brace (convexity or concavity) to thereby alter at least one voicing characteristic of the soundboard. The "at least one voicing characteristic" may include, but is not necessarily limited to, a resonant frequency and/or a location of a resonant frequency on the soundboard.

BRIEF DESCRIPTION OF THE DRAWINGS

Many advantages of the present invention will be apparent to those skilled in the art with a reading of this specification in conjunction with the attached drawings, wherein like reference numerals are applied to like elements and wherein.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. The adjustable soundboard for acoustic stringed instruments disclosed herein boasts a variety of inventive features and components that warrant patent protection, both individually and in combination.

Figure 1:
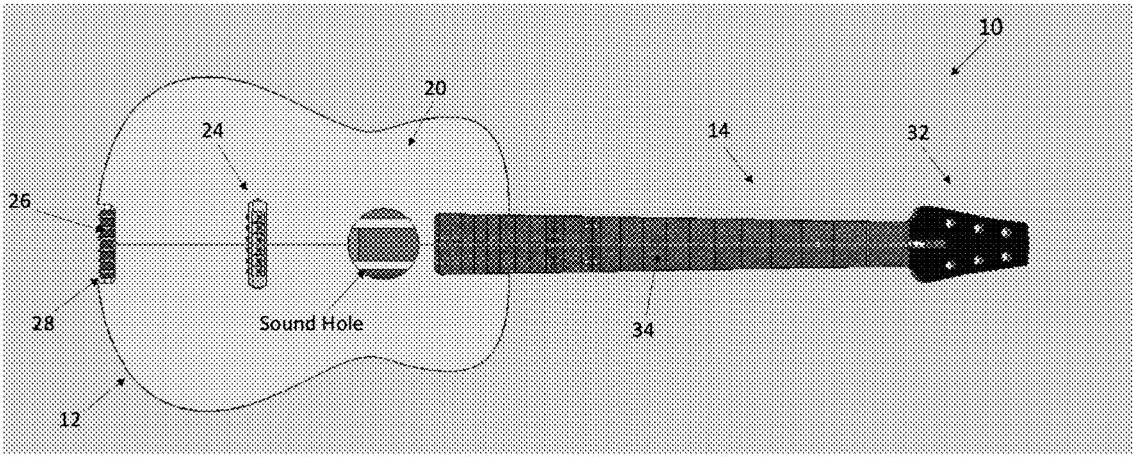
FIGS. 1-2 are top and side views, respectively, of an acoustic guitar with an adjustable soundboard according to aspects of the present invention, equipped with a plurality of access ports to adjust internally disposed adjustable braces of the types shown and described with reference to FIGS. 4-22.
Figure 2:
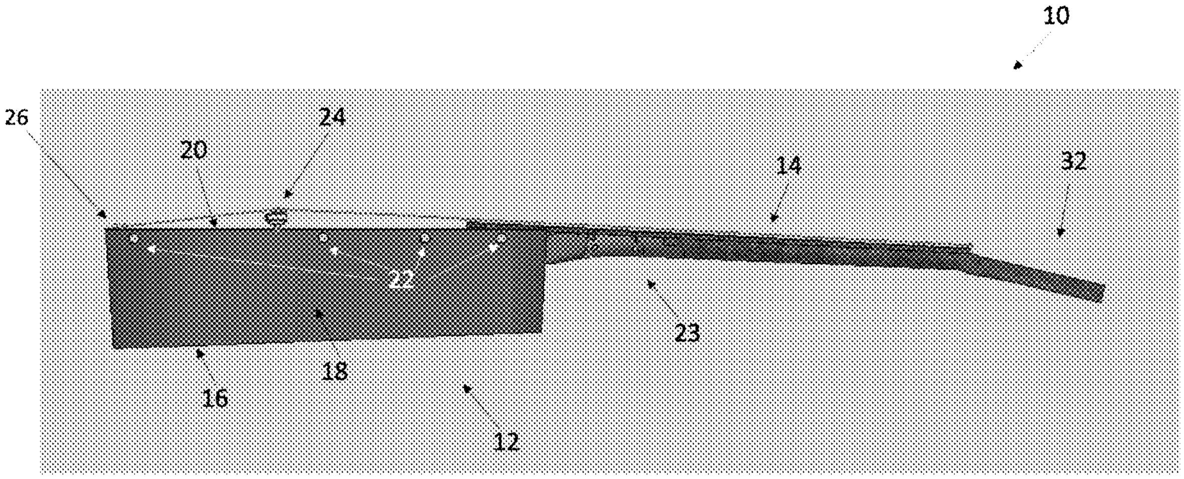
Figure 3:
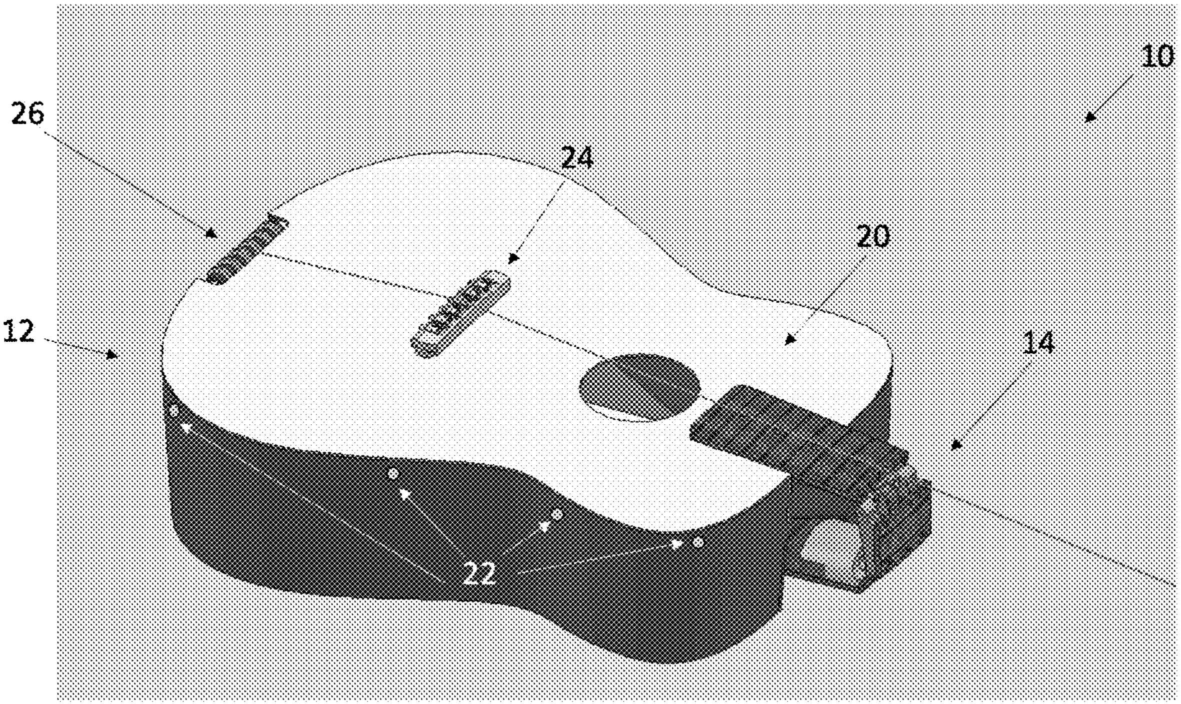
FIG. 3 is a perspective view of the acoustic guitar of FIGS. 1-2 in a folded state according to aspects of the present invention, equipped with an adjustable soundboard and the plurality of access ports according to aspects of the present invention.

FIGS. 1-3 show an acoustic guitar 10 of the present invention having a body 12 and a neck 14 extending therefrom. The body 12 includes a bottom 16, a side 18 and a soundboard 20. The body 12 may be manufactured from any of a variety of known or future-developed materials, including but not limited to traditional wood construction, carbon fiber construction (e.g. laid-up and/or molded with long and/or short strands) and/or alternate materials such as aluminum. The soundboard 20 is equipped with adjustable bracing (described in detail below) on the underside such that the soundboard 20 may be referred to as an "adjustable soundboard." A plurality of access ports 22 are disposed along the upper region of the side 18 of the body 12, which are dimensioned to allow a user or technician to insert a driver or other tool to engage the adjustable bracing to alter the tension on the soundboard 20 to optimize or otherwise tailor the voicing of the soundboard 20. This is accomplished by selectively altering the shape of the adjustable braces so as to create one or more regions of desired convexity, which impacts the acoustic properties of the soundboard 20.

The body 12 includes a host of standard components, such as (but not limited to) a roller bridge 24 mounted to the soundboard 20, a string roller assembly 26 mounted in an end recess 28. The string roller assembly 26 forms part of an actuator assembly (not shown) mounted within the end recess 28. The purpose of the actuator assembly is to tighten and loosen the strings of the guitar 10 to enable folding. The strings (not shown) pass over the string roller assembly 26, the roller bridge 24, and the fingerboard 34 before terminating at tuners (not shown) mounted to the headstock 32 of the neck 14. By positioning the string roller assembly 26 at the end of the body 12, and having the strings extend over the bridge 24, the soundboard 20 of this embodiment is pressure activated such as in an "archtop" guitar, meaning the soundboard 20 will be subject to vibrations that are imparted from the strings in a largely "up and down" manner through the roller bridge 24 when the strings are played. The actuator and acoustic guitar 10 may be of the type shown and described in co-pending and commonly owned U.S. Non-Provisional patent application Ser. No. 17/992,207 filed Nov. 22, 2022 entitled "Foldable Acoustic Stringed Instrument" the entire contents of which are hereby incorporated by reference into this disclosure as if set forth fully herein.

Although shown as an acoustic guitar, and moreover one that folds via a mid-neck hinge 23, it will be appreciated that aspects of the instrument 10 described herein may be used in any of a variety of non-folding acoustic fretted instruments, including but not limited to traditional (non-folding) acoustic guitars and ukuleles.

Figure 4:
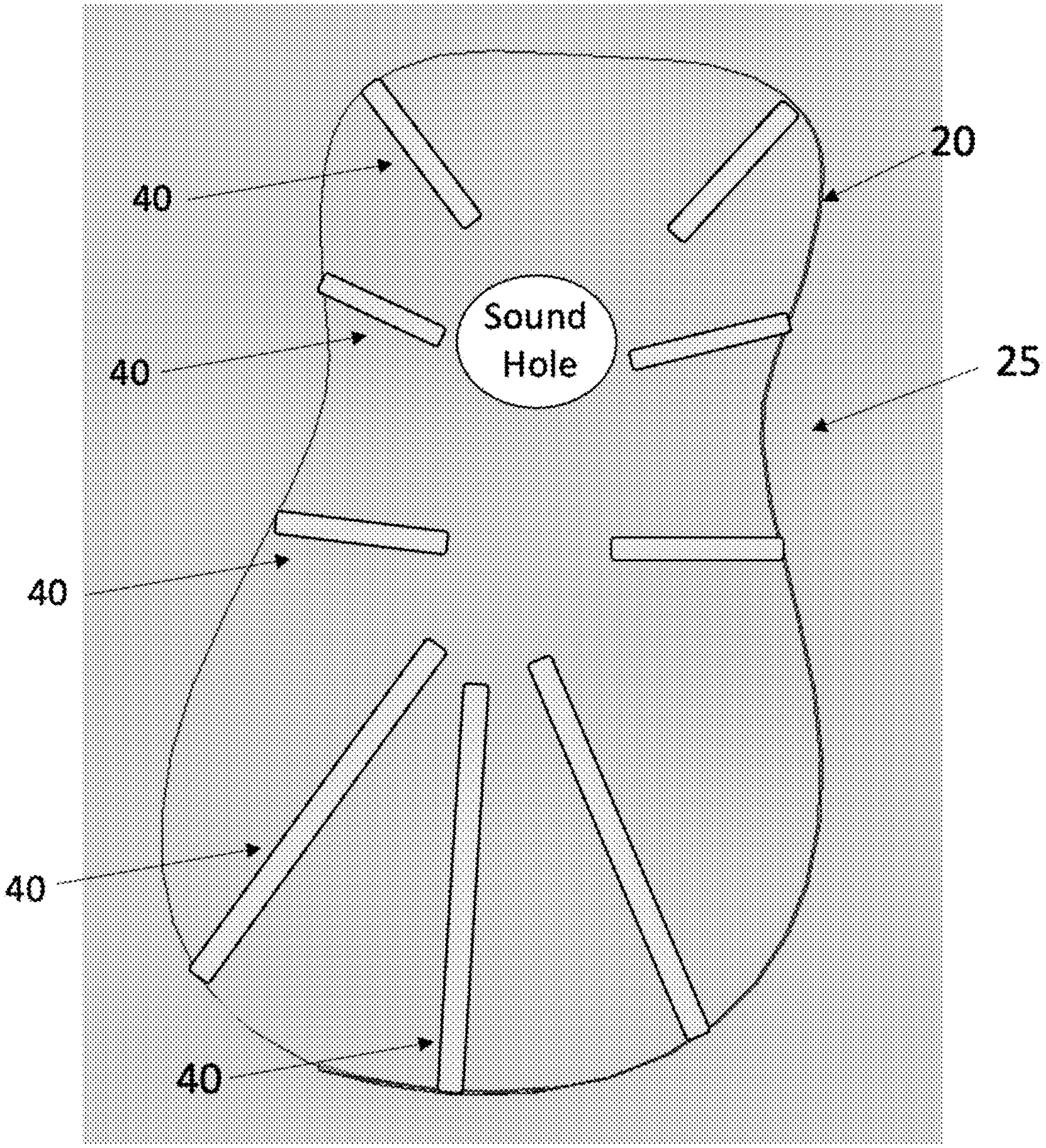
FIGS. 4-5 are bottom and side views, respectively, of an adjustable soundboard according to aspects of the present invention equipped with a plurality of "one-way" adjustable braces to selectively impart a convexity on the upper surface of the soundboard according to aspects of the present invention.
Figure 5:
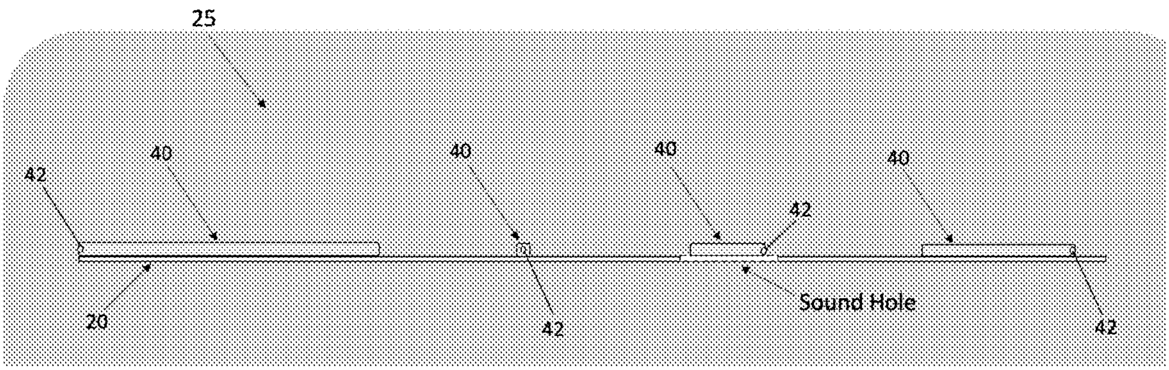

FIGS. 4-5 shows an adjustable soundboard 25 according to aspects of the present invention equipped with a plurality of "one-way" adjustable braces 40 to selectively impart a convexity on the upper surface of the soundboard 20 according to aspects of the present invention. The one-way adjustable braces 40 are mounted to the lower surface of the soundboard 20. Each adjustable brace 40 includes a proximal end that terminates at the approximate edge of the soundboard 20. The terminal end of the adjustable brace 40 includes an aperture 42 to access an internally disposed rotating nut (shown in FIG. 6) through the access ports 22 formed in the side 18 of the body 12 as shown in FIGS. 2-3. As will be described below, a tech or user may insert a driver (e.g. hex driver) into the rotating nut to alter the vertical shape of the adjustable brace 40. For example, in so doing a convexity is imparted on the soundboard 20 in the region of the adjustable brace 40. By "dialing in" one or more of the adjustable braces 40, the voicing of the soundboard 20 may be tailored and/or optimized. It will be appreciated that standard, straight, non-adjustable braces may also be used along with the adjustable braces 40 of the present invention.

Figure 6:
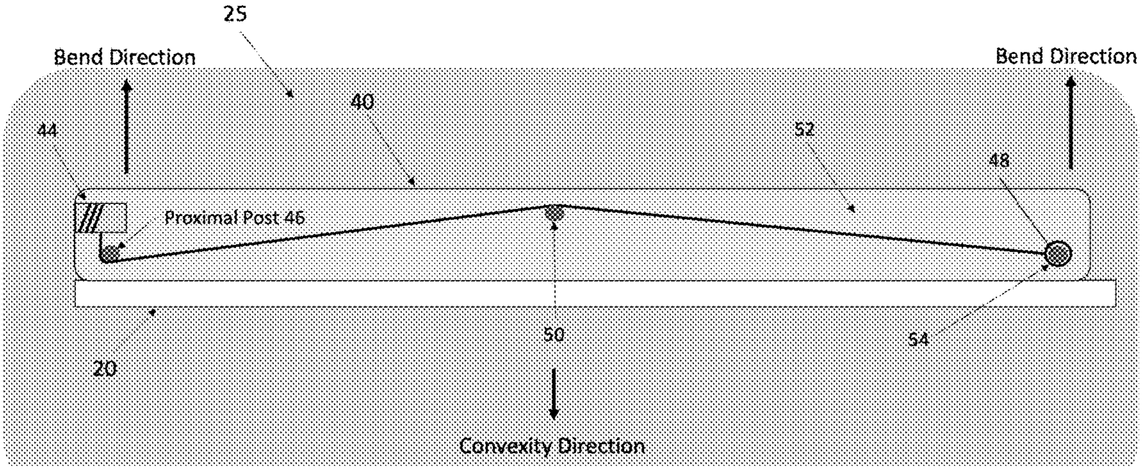
FIG. 6 is a side view of an adjustable soundboard detailing the construction of a "one-way" adjustable brace according to aspects of the present invention which enables a user to selectively impart a convexity on the upper surface of the soundboard to optimize the voicing of the soundboard according to aspects of the present invention.
Figure 7:
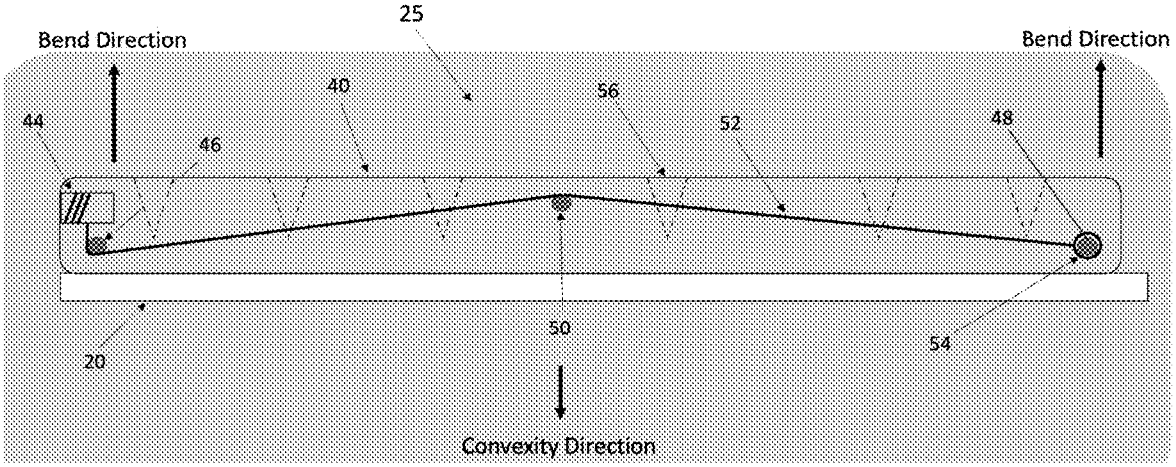
FIG. 7 is a side view of an adjustable soundboard detailing the construction of a "one-way" adjustable brace of the type shown in FIG. 6, including a series of notches formed in the upper surface of the brace which increase the flexibility of the adjustable brace during use according to aspects of the present invention.

FIGS. 6-7 shows an adjustable soundboard 25 according to aspects of the present invention detailing exemplary embodiments of the "one-way" adjustable braces 40 to selectively impart a convexity on the upper surface of the soundboard according to aspects of the present invention. Each adjustable brace 40 is equipped with a rotating nut 44 at a proximal end, a proximal post 46, distal post 48 at a distal end, a middle post 50, and a cable 52. The cable 52 is anchored to the distal post 48 via a cable loop 54. From the cable loop 54, the cable 52 passes over the middle post 50, under the proximal post 46, and terminates at the rotating nut 44. The path of the cable 52 generally approximates an acute triangle with the middle post 50 forming the apex and the proximal and distal posts 46, 48 forming the vertexes of the base. While shown as an acute triangle, with the middle post 50 bisecting the distance between the proximal and distal posts 46, 48, it will be appreciated that the locations of the posts 46, 48, 50 may differ from that shown in FIGS. 6-7 without departing from the scope of the invention. For example, the middle post 50 may be positioned either closer to the proximal post 46 or distal post 48 and create an obtuse triangle path for the cable 50. Doing so can create a modified convexity or shaping at other locations along the length of the brace 40, which may advantageously avail a greater range of voicing for soundboard 20.

Regardless of post location, clockwise rotation of the nut 44 will selectively tighten the cable 52 by effectively shortening the length of the cable 52 extending between the proximal and distal posts 46, 48. This tightening of the cable 52 will cause the brace 40 to bend from its original, generally flat shape to an altered, curved state. This is best represented in FIGS. 6-7 as the "bend directions" at the proximal and distal ends, which create the "convexity direction" in the region of the middle post 50. To facilitate bending, the brace 40 may be optionally equipped with a series of notches 56, which are voids created in the upper and/or lower surface of the brace 40. By reducing the amount of material in the brace 40, the notches 56 may it easier to impart the desired shaping of the brace 40 during operation of the rotating nut 44. The shape of the notches 56 is shown, by way of example only, as generally triangular, however it will be appreciated that the shape and number of the notches 56 may be varied from that shown without departing from the scope of this aspect of the present invention.

The rotating nut 44 may be forced into rotation in any number of suitable manners, including mechanical and/or electro-mechanical. In the mechanical example, the rotating nut 44 may be equipped with an internal recess (e.g. hex female) such that a technician can insert a driver (e.g. hex driver) into the internal recess and force the rotating nut 44 into clockwise rotation (to tighten the cable 52) or counter-clockwise rotation (to loosen the cable 52) to achieve a desired about the convexity on the soundboard 20. The rotating nut 44 may be accessed via the side ports 22 formed in the upper edge of the side 18 of the body 12. In the electro-mechanical example, a solenoid or other electro-mechanical device may be used to selectively tighten and loosen the cable 52. The power source to operate an electro-mechanical cable adjustment system may include a battery disposed inside the body 12, one or more solar cell(s) mounted on the body 12 or other aspects of the guitar 10, a directed-energy transmitter selectively positioned adjacent to the electro-mechanical cable adjustment system, and/or a rotatable magnet configured to drive the rotating nut 44 from the exterior of the soundboard 20.

Figure 8:
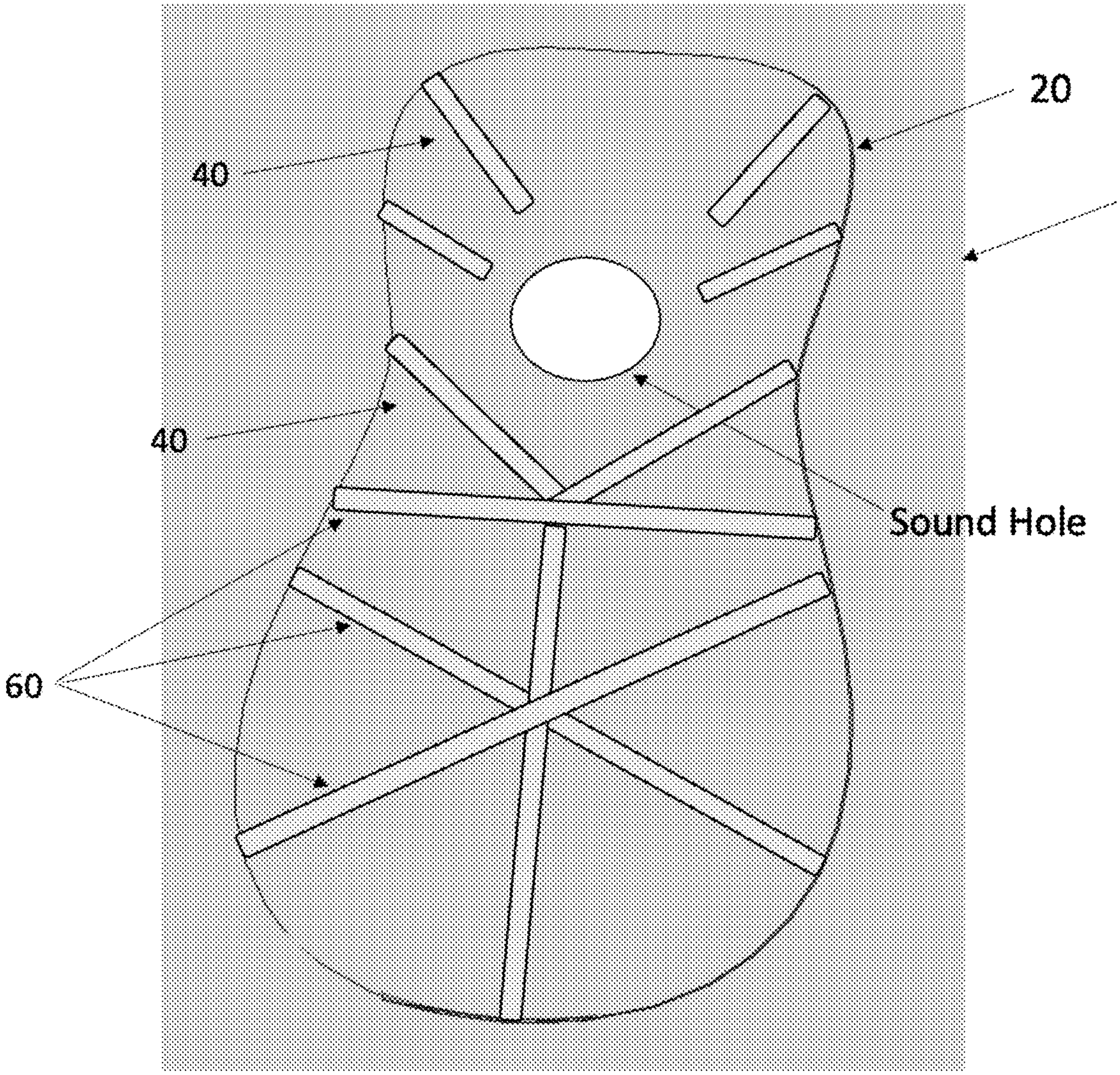
FIGS. 8-9 are bottom and side views, respectively, of an adjustable soundboard according to aspects of the present invention equipped with a plurality of "two-way" adjustable braces to selectively impart a convexity on the upper or lower surface of the soundboard according to aspects of the present invention.
Figure 9:
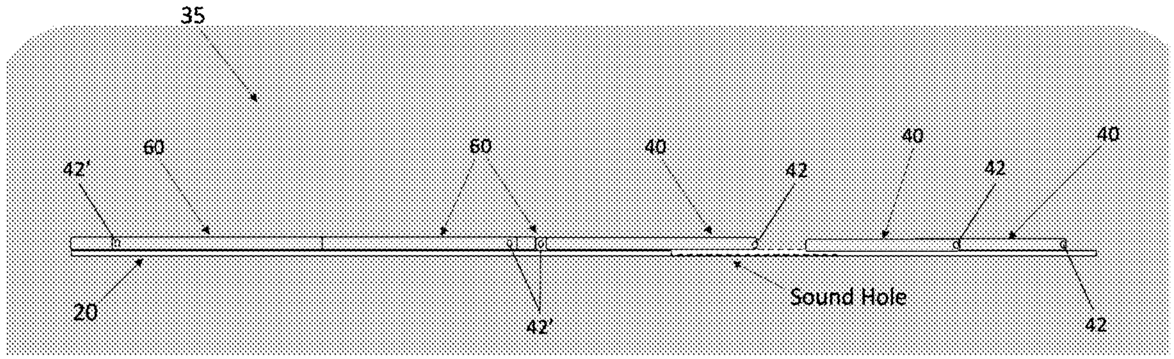

FIGS. 8-9 show an adjustable soundboard 35 according to aspects of the present invention equipped with a plurality of "two-way" adjustable braces 60 to selectively impart a convexity on the upper or lower surface of the soundboard 20 according to aspects of the present invention. In this example, the soundboard assembly includes two-way adjustable braces 60 in addition to one-way adjustable braces 40, however it will be appreciated that the soundboard 20 may be equipped with only two-way adjustable braces 60. In either event, the two-way adjustable braces 60 are mounted to the lower surface of the soundboard 20. Each adjustable brace 60 includes the same features as the one-way adjustable braces 40 described above with reference to FIGS. 4-7, adding a second set of features to enable a user to tailor the shape of the brace to achieve either Convexity A (by imparting Bend Direction A on the proximal and distal ends of the brace 60) or Convexity B (by imparting Bend Direction B on the proximal and distal ends of the brace 60). For convenience, the features common to both the one-way adjustable brace 40 and the two-way adjustable brace 60 will use the same reference numerals and add a prime (') to the new features in the two-way adjustable brace 60 that enable the creation of Convexity B. The two-way adjustable braces 60 include a proximal end and a distal end that each terminate at the approximate edge of the soundboard 20. The terminal end of the adjustable brace 60 includes an aperture 42' to access an internally disposed rotating nut (shown in FIG. 10-11) through the access ports 22 formed in the side 18 of the body 12 as shown in FIGS. 2-3.

Figure 10:
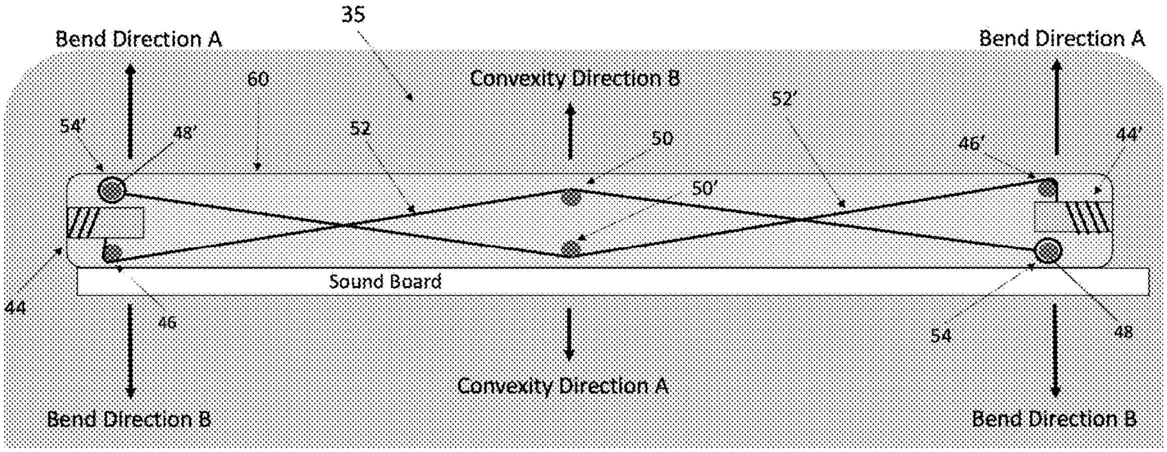
FIG. 10 is a side view of an adjustable soundboard detailing the construction of a "two-way" adjustable brace according to aspects of the present invention which enables a user to selectively impart a convexity on the upper or lower surface of the soundboard to optimize the voicing of the soundboard according to aspects of the present invention.
Figure 11:
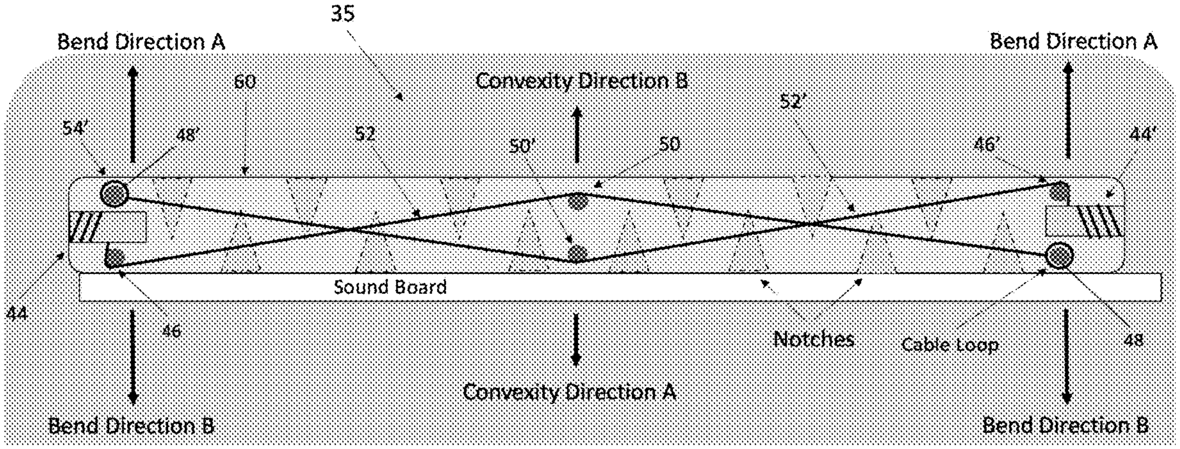
FIG. 11 is a side view of an adjustable soundboard detailing the construction of a "two-way" adjustable brace of the type shown in FIG. 10, including a series of notches formed in the upper and surfaces of the brace which increase the flexibility of the adjustable brace during use according to aspects of the present invention.

To create Convexity A, the rotating nut 44 may be driven into clockwise rotation to selectively tighten the cable 52 by effectively shortening the length of the cable 52 extending between the proximal and distal posts 46, 48. This tightening of the cable 52 will cause the brace 60 to bend from its original, generally flat shape to an altered, curved state, as best represented in FIGS. 10-11 as the "Bend Direction A" at the proximal and distal ends. To create Convexity B, the rotating nut 44' may be driven into clockwise rotation to selectively tighten the cable 52' by effectively shortening the length of the cable 52' extending between the proximal and distal posts 46', 48'. This tightening of the cable 52' will cause the brace 60 to bend from its original, generally flat shape to an altered, curved state, as best represented in FIGS. 10-11 as the "Bend Direction B" at the proximal and distal ends. In so doing, the two-way adjustable brace 60 allows a technician—either during manufacture or post-manufacture—to selectively create convexity on either surface of the soundboard 20 in the region of the adjustable brace 60. By "dialing in" one or more of the two-way adjustable braces 60, the voicing of the soundboard 20 may be tailored and/or optimized. It will be appreciated that standard, straight, non-adjustable braces and/or one-way adjustable braces 40 of FIGS. 4-7 may also be used along with the two-way adjustable braces 60 without departing from the scope of the present invention.

To facilitate bending, the brace 60 may be optionally equipped with a series of notches 56, which are voids created in the upper and/or lower surface of the brace 60. By reducing the amount of material in the brace 60, the notches 56 may it easier to impart the desired shaping of the brace 60 during operation of the rotating nuts 44, 44'. The shape of the notches 56 is shown, by way of example only, as generally triangular, however it will be appreciated that the shape and number of the notches 56 may be varied from that shown without departing from the scope of this aspect of the present invention.

Figure 12:
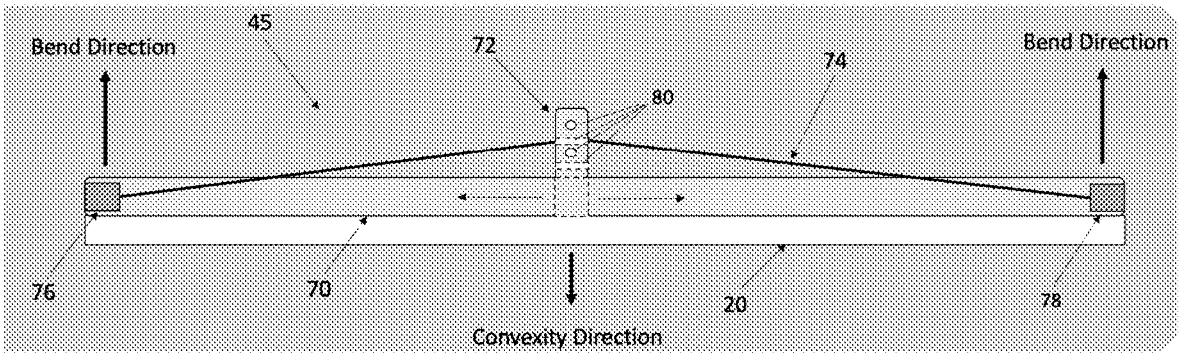
FIG. 12 is a side view of an adjustable soundboard with a "one-way" adjustable brace assembly comprising a movable fulcrum post, a cable extending through the fulcrum post, and a pair of adjustment nuts mounted to the brace which collectively enable a user to selectively impart a convexity on the upper surface of the soundboard according to aspects of the present invention.

FIG. 12 shows an adjustable soundboard 45 with a "one-way" adjustable brace 70 having a movable fulcrum post 72, a cable 74 extending through the fulcrum post 72, and a pair of adjustment nuts 76, 78 mounted to the brace which collectively enable a user to selectively impart a convexity on the upper surface of the soundboard 20 according to aspects of the present invention. The fulcrum post 72 includes one or more cable apertures 80, which are dimensioned to pass one or more cable(s) 74 therethrough. The adjustment nuts 76, 78 are mounted at the proximal and distal ends, respectively, of the brace 70 and are coupled to the cable 74. The adjustment nuts 76, 78 are rotatably mounted to the brace 70 such that, when rotated (e.g. via a driver inserted into one or more of the nuts 76, 78), the cable 74 will be effectively shortened to impart the bend direction, thus creating a convexity on the exterior (upper) surface of the soundboard 20.

The fulcrum post 72 is adjustably mounted to the brace 70, meaning a user can selectively position the fulcrum post 72 at any of a variety of locations along the length of the brace 70. This may be accomplished in any suitable manner, including equipping the brace 70 with an internally disposed rail dimensioned to slide the fulcrum post 72 to a given location and then lock the fulcrum post 72 in position. If positioned on either side of the mid-point, the fulcrum post 72 in conjunction with the cable 74 will impart asymmetric shaping on the soundboard 20 according to certain aspects of the present invention. While shown with two adjustment nuts 76, 78, it will be appreciated that one may be replaced with an anchor and thus only be adjustable from one end of the adjustable brace 70 without departing from the scope of the invention. The fulcrum post 72 may have multiple cable apertures 80 to vary the height of the fulcrum point, which can alter the shaping of the soundboard 20. Cable apertures 80 may be of alternating direction to accommodate multiple cables 74 at the same time, of varying direction relative to the fulcrum post 72.

Figure 13:
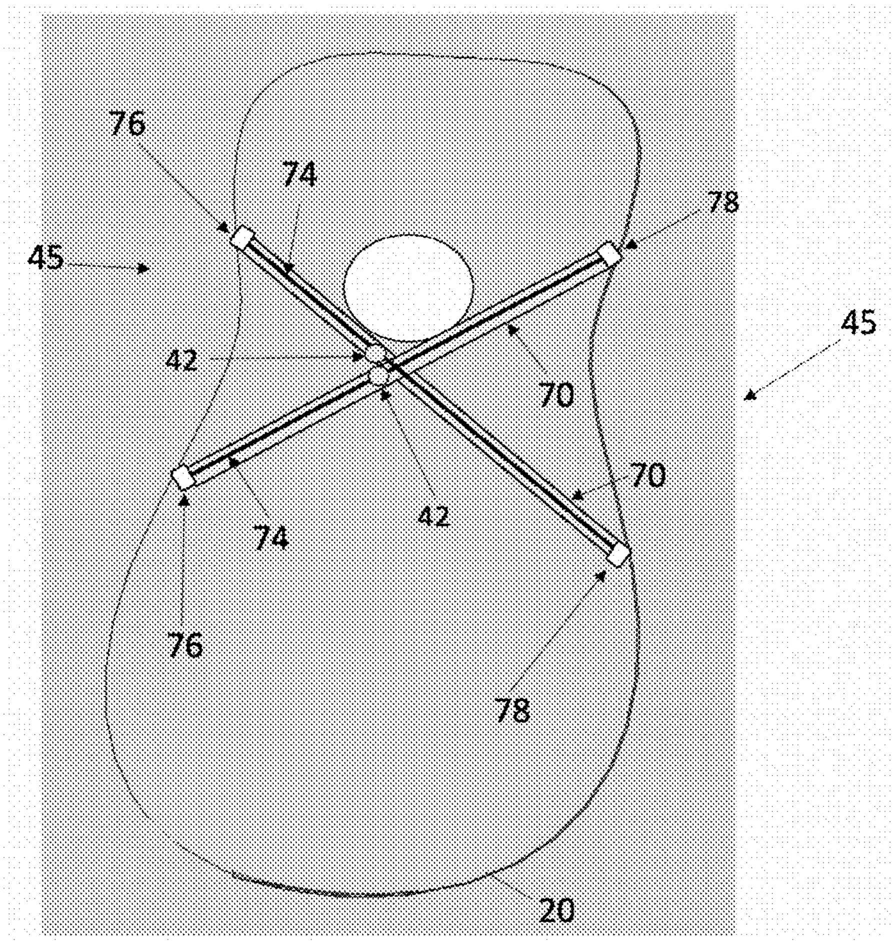
FIG. 13 is a bottom view of an adjustable soundboard equipped with two (2) adjustable brace assemblies of the type shown in FIG. 12 according to aspects of the present invention.

FIG. 13 shows an adjustable soundboard 45 equipped with two (2) adjustable brace assemblies 70 of the type shown in FIG. 12 according to aspects of the present invention. The lower surface of soundboard 20 includes one or more adjustable braces 70 each having a moveable fulcrum post 72, which extend generally perpendicularly from the brace 70. A cable 74 passes through a cable aperture 80 formed in the brace 70. Each adjustment nut 76, 78 may be used to selectively adjust the tension in the cable 74 and may be accessed via access ports 22 in the side 18 of the body 12 as shown in FIGS. 2-3. To adjust the shape of the soundboard 20, either adjustment nut 76, 78 may be rotated to selectively alter the tension of the cable 64, so as to selectively modify the shape of the soundboard 20 between the adjustment nuts 76, 78 and the fulcrum post 72. In so doing, a convexity may be imparted on the upper surface of the soundboard 20 in the region of the fulcrum post 72.

The brace 70 may be mounted to the soundboard 20 or made as an integral part of the soundboard 20, such as (by way of example) if the soundboard 20 and brace 70 are molded or otherwise constructed from carbon fiber. The fulcrum post 72 may be moveable along the brace 70 to alter the position of the fulcrum posts 72, which may impart asymmetric shaping on the soundboard 20 for modified tone or voicing. One or more cables 74 extend over or through the fulcrum posts 72. By "dialing in" one or more of the adjustable nuts 76, 78, the voicing of the soundboard 20 may be tailored and/or optimized. Adjustable braces 70 may extend entire side-to-side distance of soundboard 20 (as shown), for two-sided access and adjustability, or alternatively the adjustable brace 70 may be shorter and only accessed and adjusted from one side of the soundboard 20. Whether the adjustable braces 70 are one-sided or two-sided, the soundboard 20 may be equipped with any combination and/or range of sizes to enable a high degree of tailoring of the shaping and/or voicing of the soundboard 20. It will be appreciated that standard, straight, non-adjustable braces and/or one-way adjustable braces 40 of FIGS. 4-7 and/or two-way adjustable braces 60 of FIGS. 8-11 may also be used along with the adjustable braces 70 without departing from the scope of the present invention.

Figure 14:
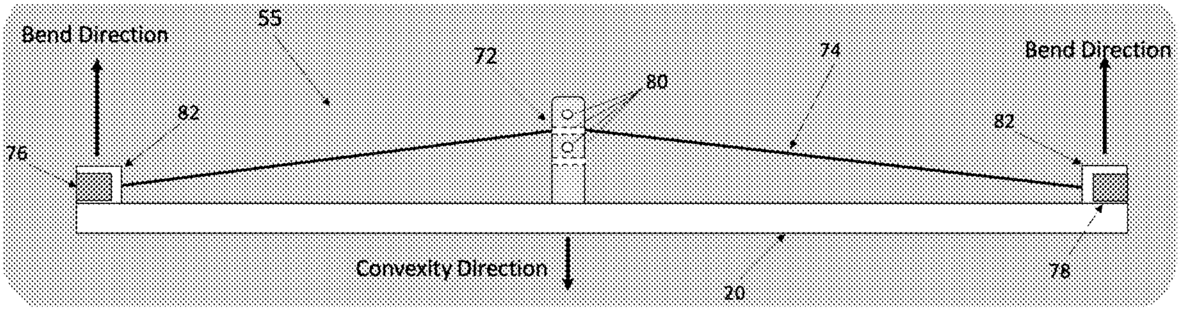
FIG. 14 is a side view of an adjustable soundboard detailing the construction of a "one-way" adjustable brace assembly comprising a fixed fulcrum post, a cable extending through the fulcrum post, and a pair of adjustment nuts mounted to the soundboard which collectively enables a user to selectively impart a convexity on the upper surface of the soundboard according to aspects of the present invention.

FIG. 14 shows an alternate embodiment, adjustable soundboard 55, wherein the fulcrum posts 72 are fixed relative to the soundboard 20, as opposed to being moveable as shown in FIGS. 12-13. This is accomplished by mounting fulcrum post 72 directly to soundboard 20, such that no separate brace is required, for example by molding the fulcrum post 72 into the soundboard 20 during manufacture from carbon fiber. A cable 74 extends through a cable aperture 80 in the fulcrum post 72 and terminates with an adjustment nut 76, 78 at either end. Each rotating nut 76, 78 is rotatable within a nut housing 82 forming part of soundboard 20. To adjust the soundboard 20 according to the present invention, a technician may use driver to rotate either adjustment nut 76, 78, which can be accessed through ports 22 formed in the upper region of the side 18 of the acoustic body 12 as shown in FIGS. 2-3. Clockwise rotation of an adjustment nut 76, 78 will shorten the effective length of the cable 74, which forces each end of the soundboard 20 at the location of the nut housings 82 into the bend direction shown in FIG. 14. In so doing, a convexity is created on the soundboard 20 to thereby alter or otherwise optimize the voicing of the soundboard 20.

While shown rigidly fixed at a single point on the soundboard 20, the fulcrum posts 72 may be moveable or multiple fulcrum posts 72 may be provided to impart asymmetric shaping on the soundboard 20. One of the adjustment nuts 76, 78 may be replaced with an anchor for the cable 74, such that the cable 74 is adjustable from one end of the soundboard 20 versus two ends as shown in FIG. 14. Fulcrum post 72 may have multiple cable apertures 80 to vary the height of the fulcrum point, which can alter the shaping of the soundboard 20. Cable apertures 80 may be of alternating direction to accommodate multiple cables 74 at the same time, of varying direction relative to the fulcrum post 72. The soundboard 20 may have multiple fulcrum posts 72 in any variety of patterns in order to impart a variety of convexity or curvature regions on the soundboard 20. The cable 74 may extend through multiple fulcrum posts 72 in order to tailor the shaping and voicing of the soundboard 20.

Figure 15:
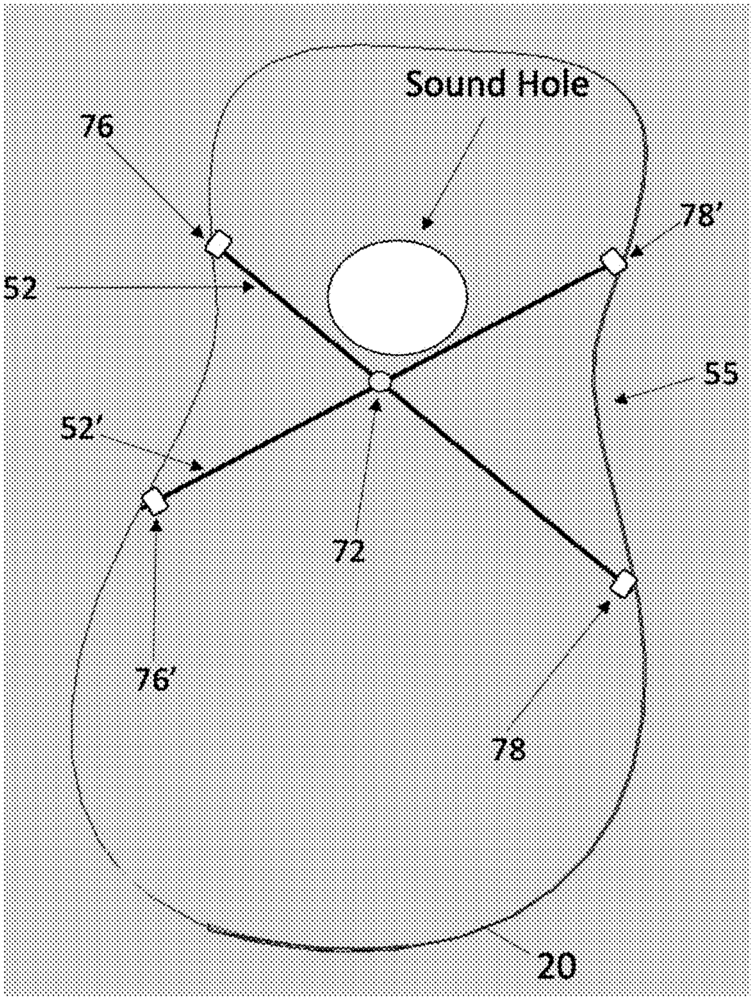
FIGS. 15-16 are bottom and side views, respectively, of an adjustable soundboard equipped with two (2) adjustable brace assemblies of the type shown in FIG. 14 according to aspects of the present invention.
Figure 16:
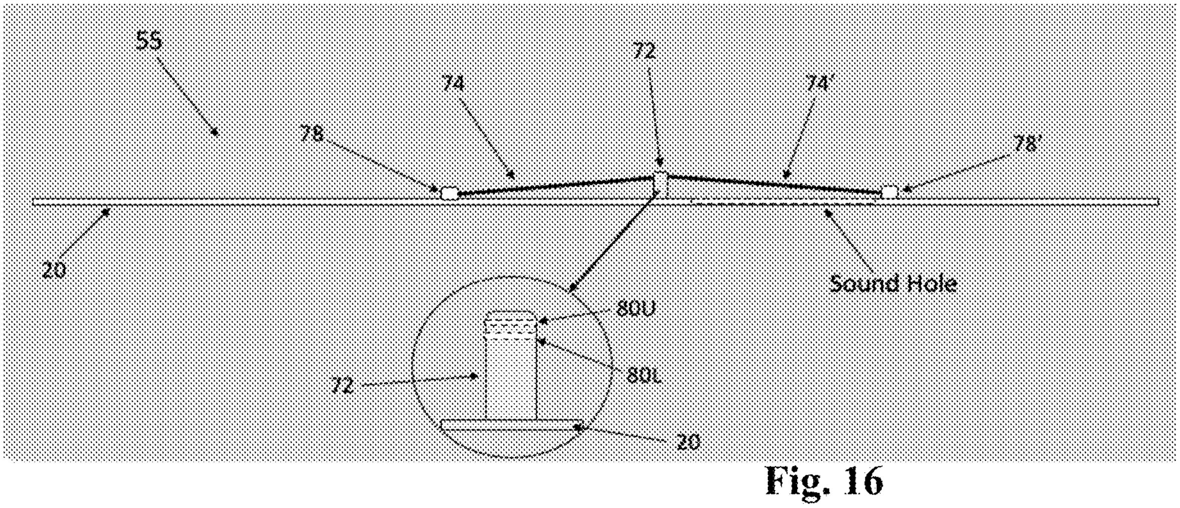

FIGS. 15-16 show the adjustable soundboard 55 of FIG. 14 from the bottom and sides, respectively, to further illustrate the operation of the adjustable soundboard with the fulcrum post 72 fixed to the underside of the soundboard 20 according to certain aspects of the present invention. In this example, a single fulcrum post 72 is positioned in the approximate centerline of the soundboard 20, proximate the sound hole. A first cable 74 extends between a first pair of adjustment nuts 76, 78, while a second cable 74' extends between a second pair of adjustment nuts 76', 78'. Each cable 74, 74' passes through a respective cable aperture formed in the fulcrum post 72. By way of example only, this may be accomplished by equipping the fulcrum post 72 with an upper cable aperture 80U (for upper) and a lower cable aperture 80L (for lower), preferably with each cable aperture having a specific angle to enable the cable 74 to pass generally straight between the adjustment nuts 76, 78 and the cable 74' to pass generally straight between the adjustment nuts 76', 78' as best shown in FIG. 15.

While shown as a single post with one or more cable apertures 80 in FIGS. 12-16, it will be appreciated that the fulcrum post 72 may take any of a variety of additional forms or configurations without departing from the scope of the present invention.

Figure 17:
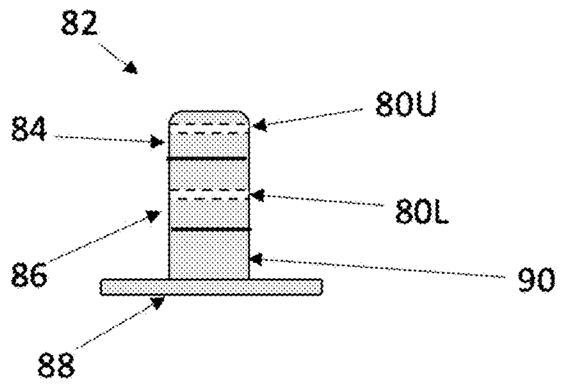
FIG. 17 is an alternate embodiment of a fulcrum post of the type shown in FIGS. 12-16, equipped with at least one rotatable section such that cable aperture(s) formed there may be selectively rotated to best accommodate the cable irrespective of the position the base is mounted to the soundboard according to aspects of the present invention.

As shown in FIG. 17, a rotating fulcrum post 82 may be equipped with at least one or more rotatable sections such that upper and lower cable aperture 80U, 80L may be selectively rotated to best accommodate the direction of the cable 74 irrespective of the position that the fulcrum post 82 is mounted to the soundboard 20 according to aspects of the present invention. More specifically, the rotating fulcrum post 82 includes an upper rotating member 84, a lower rotating member 86, a base 88, and a static cylinder 90 extending from the base 88. While shown with two rotating members (upper and lower 84, 86), it will be appreciated that the rotating fulcrum post 82 may be equipped with only one rotating member, which itself may have one or more cable apertures 80. The upper and lower rotating members 84, 86 are rotatably coupled to one another, as well as the static cylinder 90, such that the upper and lower cable apertures 80U, 80L can each be positioned to receive a respective cable 74, 74' therethrough. The base 88 may be mounted to a brace (not shown), which is in turn mounted to the soundboard 20. Alternatively, the base 88 may be mounted directly to the soundboard 20, such as during manufacture if the soundboard 20 is molded or otherwise constructed from carbon fiber. The cable apertures 80U, 80L preferably pass generally horizontally through the respective rotating member 84, 86, but may be angled relative to the soundboard 20 if required or desired. Rotating fulcrum post 82 may include more or less than the two (2) rotating members 84, 86 shown.

Figure 18:
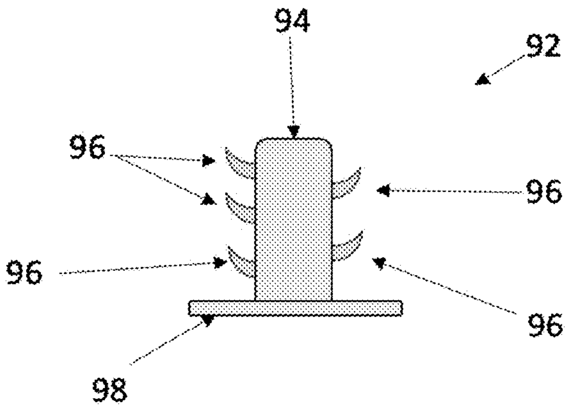
FIG. 18 is an alternate embodiment of a fulcrum post of the types shown in FIGS. 12-17, equipped with at least one prong extending from the side of the fulcrum post such that a cable may be selectively coupled to the fulcrum post without passing the cable through apertures according to aspects of the present invention.

As shown in FIG. 18, a pronged fulcrum post 92 may be equipped with at least one prong extending from the side of the fulcrum post 92 such that a cable (not shown) may be selectively coupled to the fulcrum post 92 without passing the cable through apertures according to aspects of the present invention. Pronged fulcrum post 92 includes main post 94 with a plurality of prongs 96 extending laterally therefrom, wherein the main post 94 extends generally perpendicularly from a base 98. The prongs 96 are dimensioned to allow a technician to string or otherwise loop a cable (not shown) over a selected prong 96, depending upon the desired height of the prong 96 relative to the soundboard 20. The base 98 may be mounted to a brace (not shown), which is in turn mounted to the soundboard 20. Alternatively, the base 98 can mounted directly to the soundboard 20, such as during manufacture if the soundboard 20 is molded or otherwise constructed from carbon fiber. The cable prongs 96 may extend generally perpendicularly to the side of the fulcrum post 92, or alternatively may be angled if required or desired. Pronged fulcrum post 92 may include more or less than the number prongs 96 shown, as well as varying shapes, dimensions and locations for each or some of the prongs 96.

Figure 19:
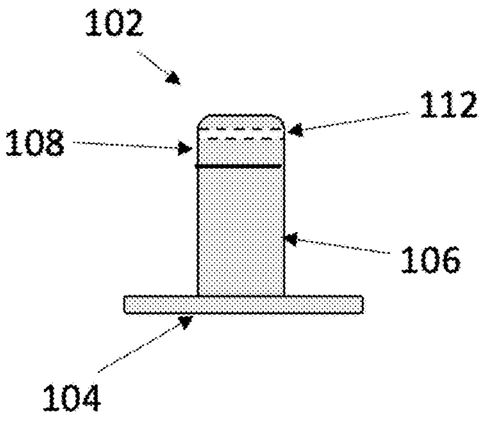
FIGS. 19-20 are side views of an alternate embodiment of a fulcrum post of the type shown in FIGS. 12-16, although telescoping such that the height of the cable aperture may be adjusted during or after manufacture according to aspects of the present invention.
Figure 20:
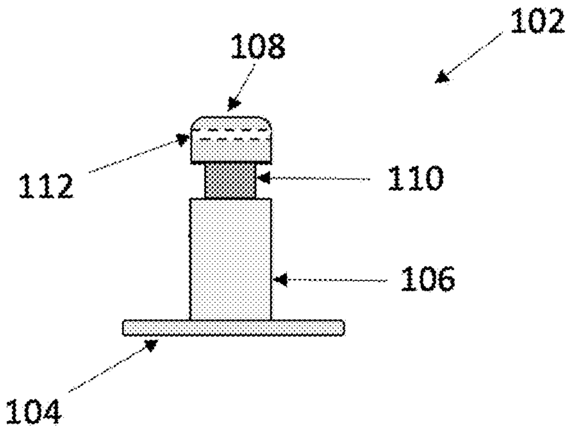

As shown in FIGS. 19-20, a telescoping fulcrum post 102 includes a telescoping feature such that the height of the cable apertures may be adjusted during or after manufacture according to aspects of the present invention. The telescoping fulcrum post 102 includes a base 104, a static cylinder 106 extending from the base 104, and a telescoping member 108 having a shaft 110 that can be selectively raised and lowered relative to the static cylinder 106 as shown in FIGS. 19-20. The telescoping member 108 has at least one cable aperture 112 that can be positioned to receive a cable (not shown) therethrough. The base 104 may be mounted to a brace (not shown), which is in turn mounted to the soundboard 20. Alternatively, the base 104 can mounted directly to the soundboard 20, such as during manufacture if the soundboard 20 is molded or otherwise constructed from carbon fiber. The cable apertures 112 preferably pass generally horizontally through the telescoping member 108 but may be angled relative to the base 104 if required or desired. The telescoping fulcrum post 102 may include more than the single telescoping member 108 shown, and if so the cable apertures 112 of the telescoping members 108 may be positioned to receive cables that extend in different directions relative to the static cylinder 106.

The telescoping member 108 may be height-adjusted in any number of suitable manners, including mechanical and/or electro-mechanical. In a mechanical example, the shaft 110 may be threaded and the interior of the static cylinder 106 may have a matching internal thread such that the telescoping member 108 can be rotated counter-clockwise into a raised state as shown in FIG. 20 and clockwise to return to the lowered state shown in FIG. 19. In an electro-mechanical example, the telescoping member 108 may be height-adjusted via a solenoid and/or magnetic actuation. For example, magnets disposed in the bottom of the shaft 110 may be forced into rotation from outside the soundboard 20 by applying another magnet against the surface of the soundboard 20 and rotating it so the magnet(s) in the shaft 110 rotate along with the external magnet(s).

Figure 21:
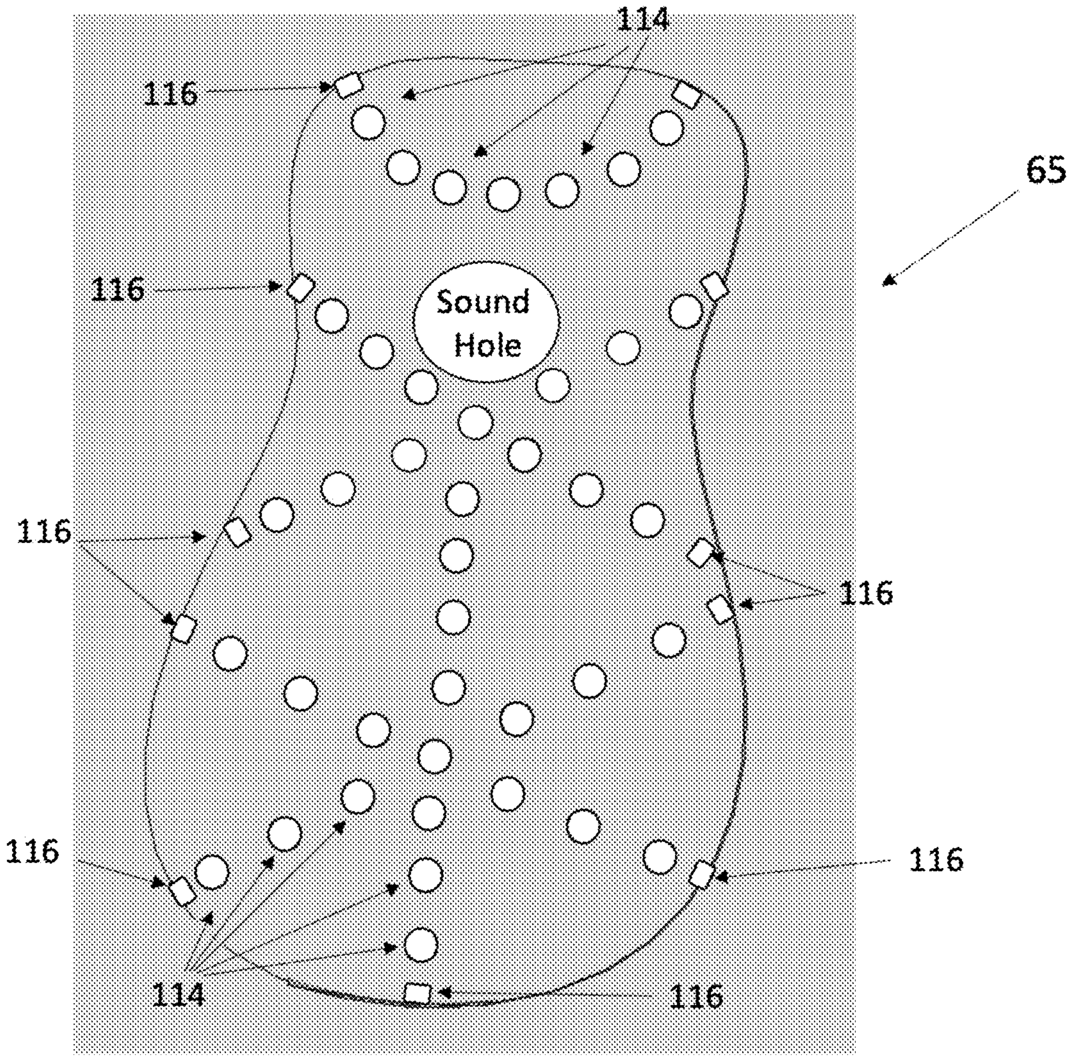
FIG. 21 is a bottom view of an adjustable soundboard equipped with a plurality of mounting recesses dimensioned to receive or otherwise mount one or more fulcrum posts according to aspects of the present invention.

While shown herein with the various fulcrum posts mounted either to a brace (FIGS. 12-13) or directly to the soundboard 20 (FIGS. 15-16), it will be appreciated that the fulcrum posts disclosed herein may be mounted to the soundboard 20 in any number of suitable manners without departing from the scope of the invention. By way of example only, as shown in FIG. 21, an adjustable soundboard 65 is equipped with a plurality of mounting recesses 114 dimensioned to receive or otherwise mount one or more fulcrum posts (not shown) according to aspects of the present invention. The mounting recesses 114 are formed in bottom surface of the soundboard 20 and may include any number of suitable patterns, such as shown by way of example in FIG. 21. For each line or specific pattern of mounting recesses 114, one or more adjustment nuts 116 are positioned adjacent to the first mounting recess 114 of said line or specific pattern in order to form an anchor point for one or more cables (not shown) to pass through the fulcrum posts (not shown) according to aspects of the present invention.

Figure 22:
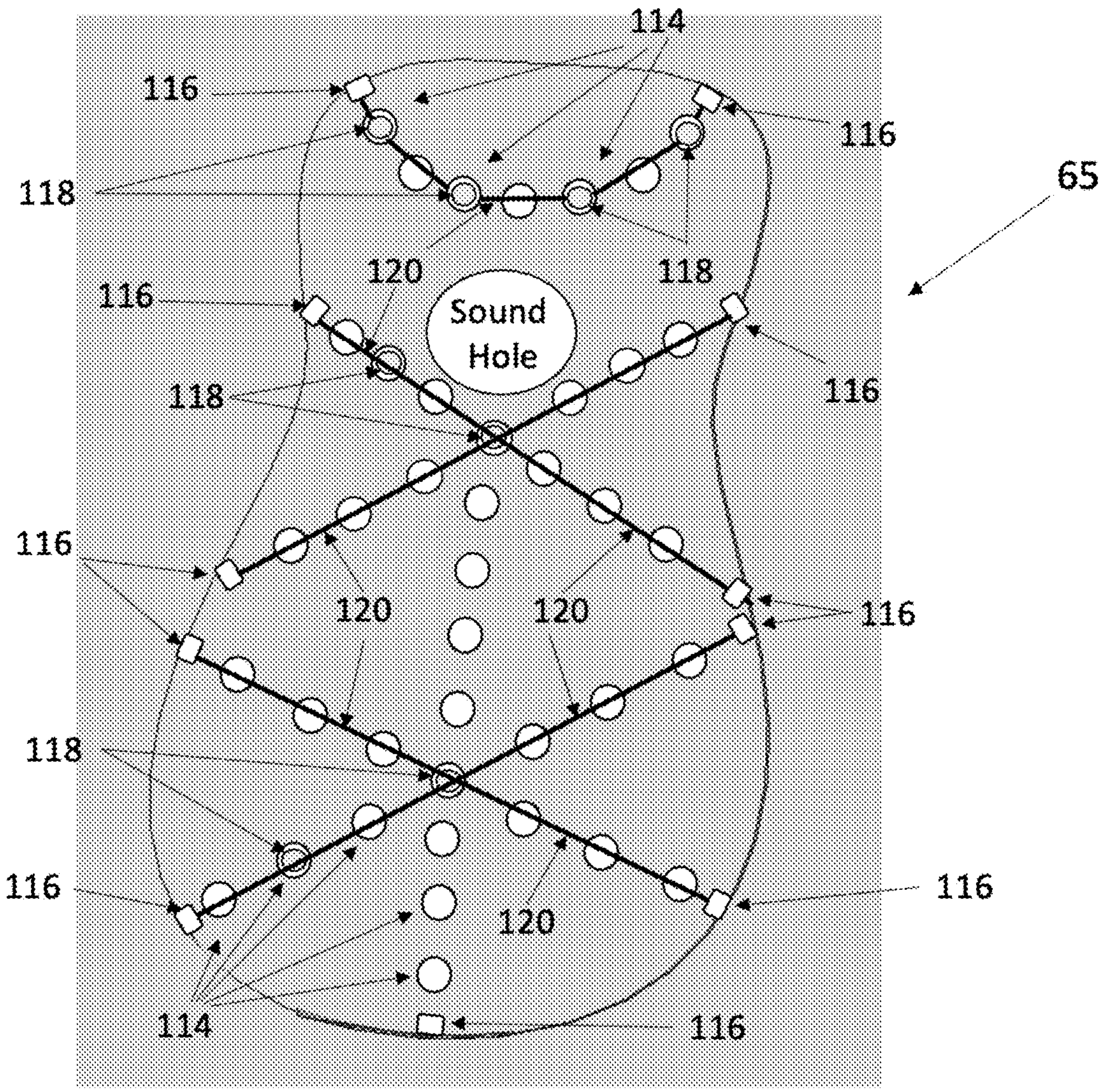
FIG. 22 is a bottom view of the adjustable soundboard of the type shown in FIG. 21 with a variety of cables extending between respective pairs of adjustment nuts according to aspects of the present invention.

FIG. 22 shows the adjustable soundboard 65 of FIG. 21 with multiple fulcrum posts 118 mounted within select mounting recesses 114 in order to selectively adjust the tension applied to the soundboard 20, and in particular regions, in order to optimize the voicing of the soundboard 20. To do so, a plurality of cables 120 are passed through one or more fulcrum posts 118 such that each may be adjusted via one or more adjustment nut 116 to optimize or tailor the voicing or acoustic properties of the soundboard 20. The fulcrum posts 118 may be mounted within the desired mounting recesses 114 in any suitable manner, including fixed (e.g. via glue or molded in during manufacture) or removable (e.g. magnets, twist-and-lock, etc. . . . ). Cables 120 can be extended through one or more fulcrum post 118, such that a cable 120 extends through only one fulcrum post 118 between a pair of adjustment nuts 116 and/or a cable 120 extends through multiple fulcrum posts 118 between a pair of adjustment nuts 116. The cables 120 may also extend in a non-linear path, such as the curved path shown above the sound hole.

Any of the features or attributes of the above the above-described embodiments and variations can be used in combination with any of the other features and attributes of the above-described embodiments and variations as desired.

From the foregoing disclosure and detailed description of certain preferred embodiments, it is also apparent that various modifications, additions and other alternative embodiments are possible without departing from the true scope and spirit. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

The invention claimed is:

1. An adjustable soundboard assembly for an acoustic stringed instrument, comprising:

a soundboard having an upper surface and a lower surface; and at least one adjustable brace on said lower surface of said soundboard, wherein said at least one adjustable brace is adjustable via at least one adjustment nut coupled to at least one cable extending between a first end and a second end of said adjustable brace, and wherein said at least one adjustable brace is configured to be adjusted to impart at least one of a convexity and a concavity to said adjustable brace to thereby alter at least one voicing characteristic of said soundboard.

2. The adjustable soundboard assembly of claim 1, wherein said adjustable brace is formed as an integral part of said soundboard.

3. The adjustable soundboard assembly of claim 1, wherein said adjustable brace is mounted to said lower surface of said soundboard.

4. The adjustable soundboard assembly of claim 1, wherein said at least one voicing characteristic of said soundboard includes at least one of a resonant frequency and a location of a resonant frequency.

5. An adjustable soundboard assembly for an acoustic stringed instrument, comprising:

a soundboard having an upper surface and a lower surface, and at least one adjustable brace on said lower surface of said soundboard, wherein said at least one adjustable brace is configured to be adjusted to impart at least one of a convexity and a concavity to said adjustable brace to thereby alter at least one voicing characteristic of said soundboard, and wherein said at least one adjustable brace includes a cable extending between a first position and a second position that is configured to be at least one of selectively tightened and loosened to alter said at least one voicing characteristic of said soundboard.

6. The adjustable soundboard assembly of claim 5, wherein said cable extends between a distal post, a proximal adjustment nut, and a middle post, wherein said distal post and said proximal adjustment nut are at a first vertical height and said middle post is at a second vertical height that is higher than said first vertical height.

7. The adjustable soundboard assembly of claim 6, wherein said proximal adjustment nut is rotatable to selectively tighten and loosen a cable to alter said at least one voicing characteristic of said soundboard.

8. The adjustable soundboard assembly of claim 5, wherein said at least one adjustable brace includes an upper surface, a lower surface adjacent to said soundboard, and plurality of notches formed along at least one of said upper and lower surfaces to facilitate bending said adjustable brace to selectively alter said at least one voicing characteristic of said soundboard.

9. An adjustable soundboard assembly for an acoustic stringed instrument, comprising:

a soundboard having an upper surface, a lower surface, and a perimeter;

at least one adjustment nut mounted along said perimeter of said soundboard; and at least one cable coupled to said at least one adjustment nut, wherein said at least one adjustment nut is configured to be selectively tightened and loosened to impart at least one of a convexity and a concavity to said soundboard to thereby alter at least one voicing characteristic of said soundboard.

10. The adjustable soundboard assembly of claim 9, wherein said at least one adjustment nut is rotatable within a nut housing formed as an integral part of said soundboard extending from said lower surface of said soundboard.

11. The adjustable soundboard assembly of claim 9, wherein said at least one adjustment nut is rotatable within a nut housing mounted to said lower surface of said soundboard.

12. The adjustable soundboard assembly of claim 9, wherein said at least one voicing characteristic of said soundboard includes at least one of a resonant frequency and a location of a resonant frequency.

13. The adjustable soundboard assembly of claim 9, wherein said at least one adjustment nut is accessible from a side aperture formed along said perimeter of said soundboard.

14. The adjustable soundboard assembly of claim 9, wherein said at least one cable and said at least one adjustment nut are housed within a brace mounted to said lower surface of said soundboard.

15. The adjustable soundboard assembly of claim 9, wherein said at least one cable and said at least one adjustment nut are housed within a brace integrally formed with said soundboard.

16. The adjustable soundboard assembly of claim 9, wherein said at least one cable extends between said adjustment nut and a fulcrum located a distance away from said adjustment nut.

17. The adjustable soundboard assembly of claim 16, wherein said fulcrum has at least one of a fixed location and an adjustable location on said soundboard.

18. The adjustable soundboard assembly of claim 16, wherein said fulcrum has a plurality of prongs configured to engage and maintain said at least one cable at a given vertical height relative to said lower surface of said soundboard.

19. The adjustable soundboard assembly of claim 16, wherein said fulcrum has at least one aperture dimensioned to receive said at least one cable, wherein said fulcrum is at least one of height-adjustable and fixed-height.

* * * * *